United States Patent [19]
van Brederode

[11] 4,066,608
[45] Jan. 3, 1978

[54] THREE COMPONENT STABILIZER SYSTEM FOR PROPYLENE POLYMERS CONTAINING GRAFTED ACRYLIC ACID WITH OR WITHOUT GLASS FIBER REINFORCEMENT

[75] Inventor: Robert A. van Brederode, Baytown, Tex.

[73] Assignee: Exxon Research & Engineering Co., Linden, N.J.

[21] Appl. No.: 616,769

[22] Filed: Sept. 25, 1975

[51] Int. Cl.$^2$ .............................................. C08K 7/14
[52] U.S. Cl. ............................ 260/42.18; 260/45.8 R; 260/45.8 NT; 260/45.85 S
[58] Field of Search .................... 260/42.18, 45.85 S, 260/45.8 NT

[56] References Cited
U.S. PATENT DOCUMENTS 3,437,550  4/1969  Paul .................................. 260/42.18
3,849,516  11/1974  Plank ............................. 260/45.85 S Primary Examiner—James H. Derrington
Attorney, Agent, or Firm—David A. Roth; Ben C. Cadenhead

[57] ABSTRACT

A three component LTHA stabilizer system of distearyl thiodipropionate, tris(3,5-di-t-butyl-4-hydroxybenzyl isocyanurate, sold under the trademark Goodrite 3114 and cyclic neopentanetetrayl bis(octadecylphosphite), sold under the trademark Weston 618 particularly suitable for glass fiber reinforced homopolypropylene or acrylic acid grafted propylene polymers. Key parts of the invention include well defined ratios of the thioester and phenolic components and good dispersion of the glass fiber to achieve the desired stability. The stabilizer system is good for other acrylic acid grafted polypropylene polymers which include impact modifiers. Other grafting monomers can be substituted for the acrylic acid.

1 Claim, No Drawings

THREE COMPONENT STABILIZER SYSTEM FOR PROPYLENE POLYMERS CONTAINING GRAFTED ACRYLIC ACID WITH OR WITHOUT GLASS FIBER REINFORCEMENT

BACKGROUND OF THE INVENTION

The oxidative stability of glass fiber reinforced propylene polymers is governed by several factors:
- Stabilizer type and dispersion
- Glass fiber type and dispersion
- Polymer type (homopolymer, grafted copolymer)
- Polymer quality (ash content, state of neutralization, etc.)

Glass fiber reinforced polyolefins are a particular oxidative stability problem, because unknown constituents on or in the glass fibers tend to accelerate the oxidation of polyolefins containing such fibers.

Ordinary stabilizer systems, even ones considered to be outstanding in homopolypropylene have been observed to be relatively ineffective in stabilizing glass reinforced polyolefins such as polypropylene.

SUMMARY OF THE INVENTION

Specific quantities and types of commercially available thioesters, phenolics and phosphites are an especially effective stabilizer system for hydrocarbon polymers and are particularly outstanding for polyolefins containing fillers.

DESCRIPTION OF THE PREFERRED EMBODIMENTS

The following invention describes a stabilizer system particularly suitable for glass fiber reinforced homopolypropylene or acrylic acid grafted propylene polymers to impart excellent long term heat aging resistance. The components used in this system include a thioester (particularly distearyl thiodipropionate, DSTDP), a phenolic (specifically tris(3,5di-t-butyl-4-hydroxybenzyl isocyanurate, by Goodrich Chemical Company sold under the trademark Goodrite 3114), and a phosphite (specifically cyclic neopentanetetrayl bis(octadecylphosphite), sold by Borg Warner under the trademark Weston 618). The system works well with all glass fibers commonly used for reinforcing propylene polymers and appears to be forgiving in the quality of the polymer used.

Not only does the stabilizer system of the invention prevent oxidative degradation in glass reinforced systems in a novel and outstanding manner, but it also performs well in non-filler environments.

It is an important part of the invention that the thioester and phenolic components be present in well specified ratios and be well dispersed to obtain the optimum stability. Data are shown in Table I for homopolypropylene blended with about 3 percent acrylic acid grafted polypropylene that show that for a constant total concentration of thioester and phenolic (0.75 weight percent) the days to mechanical failure at 150° C double as the thioester to phenolic ratio increases from 2 to 4. Increasing the concentration of the third component, Weston 618, to 0.25 weight percent at a 2 to 1 DSTDP to Goodrite 3114 ratio increases the days to mechanical failure from 80 to 87 which may well be within the experimental error of the test. Completely removing the Weston 618 reduces the stability significantly in glass fiber reinforced acrylic acid grafted polymers as will be shown later.

The above data was obtained using low ash polypropylene and acrylic acid grafted polypropylene melt blends. Table II shows what happens to the stability when the total concentration of thioester and phenolic is varied over the range 0.5 to 1.0 weight percent with a constant thioester to phenolic ratio. For a 2 to 1 ratio, the oxidative stability increases from 74 to 134 days at 150° C as the total concentration of DSTDP and Goodrite 3114 is raised from 0.5 to 1.0 weight percent. Weston 618 concentration is maintained at 0.15 weight percent. A similar increase is seen when the ratio is 4 to 1.

Table III lists the oxidative stability for four samples prepared from the following:
- Low ash polypropylene (13 ppm total chlorides)
- High ash polypropylene (68 ppm total chlorides)
- Low ash acrylic acid grafted polypropylene (26 ppm total chlorides)
- High ash acrylic acid grafted polypropylene (88 ppm total chlorides)

In sample 14 where both the polypropylene and the acrylic acid grafted polymer have high chloride contents (corresponding to high residual catalyst levels), the days to mechanical failure are reduced to 69 from the 80 days observed where both polymers are low in chlorides (sample 11). The 101 day stability observed with sample 13 appears to be real, but the reason for the high stability is not clear.

With glass fibers present, additional impurities are introduced into the polymer system. The sizing and finishing agents used on the glass fiber present a very complex and unknown variable to the system. However, the above stabilizer package is effective in producing an excellent oxidative stability in the glass fiber reinforced composite as shown in Table IV. When glass fiber is dry blended with the stabilized polymer pellets and molded directly to test specimens, the oxidative stability ranges from 56 to 89 days as the total stabilizer loading increases (see samples 15a, 16a, and 17b). The composites molded directly from a dry blend of glass fiber and pellets exhibit undispersed glass fiber bundles which serve to reduce the stability about 40 percent from that expected with the stabilized polymer alone (compare with samples 15b and 16b).

At a total thioester and phenolic concentration of 1.3 weight percent and a ratio of 3 to 1, the oxidative stability, when a glass fiber concentrate is blended with pellets and directly molded, is about the same as at 0.75 weight percent when glass fibers are blended with pellets and directly molded (compare samples 17b and 15a). However, by precompounding the glass fiber into a polymer that contains 1.3 weight percent total thioester and phenolic to give good glass fiber dispersion, the composite lasts 195 days at 150° C before mechanical failure. This indicates that the inherent stability of the polymer can be maintained if the glass fiber is dispersed well.

Although sample 15b of Table IV has the same composition as sample 2 of Table I, the oxidative stability has increased from 95 to 143 days. The only difference is that the extruders used to prepare the samples (and hence the mixing of the stabilizers into the polymer) were changed. The polymer in sample 2 which lasted 95 days at 150° C was melt mixed with stabilizers in a small (1 lb/hr) extruder without any backpressure to improve mixing. The more stable sample, 15b, was produced in a larger extruder using backpressure to mix the stabilizers better in the polymer. Thus, with improved dispersion in the polymer, the stabilizers are more effective.

Several additional observations have been made with the stabilizer system described above:

- Adding Geigy 1010 (a phenolic) along with Goodrite 3114 does not adversely affect the stability of the polymer as long as the ratio of DSTDP to phenolic is maintained.
- Removing the Weston 618 from the stabilizer package decreases the oxidative stability of the glass fiber reinforced composite by about 30 percent.
- Glass fiber reinforced himic anhydride grafted polypropylene, polypropylene grafted with mixtures of maleic anhydride and acrylic acid, and glycidyl acrylate grafted polypropylene all are well stabilized with this package of stabilizers.
- Glass fiber reinforced homopolypropylene is well stabilized with this stabilizer package.
- Glass fibers commonly utilized to reinforce propylene polymers including Owens Corning's K885 series, 452, 415; Johns Manville's 308 series, 713; and PPG's W 3250, 3148, 7311, 7312, 7315 and H7012; produce composites with similar stability when this stabilization package is used.
- The stabilizer package is suitable for polymers containing up to 6 percent acrylic acid.
- The stabilizer package is suitable for impact modified polypropylene polymers containing acrylic acid graft.

TABLE I

The ratio of Thioester (DSTDP) to Phenolic (Goodrite 3114) affects the oxidative stability of blends of acrylic acid grafted propylene polymers with homopolypropylene.*

| Sample No. | Ratio of DSTDP to Goodrite 3114** | Days to Mechanical Failure at 150° C | Total Concentration of Thioester and Phenolic**, wt.% | Total Weston 618 content, wt. % |
|---|---|---|---|---|
| 1 | 4/1 | 104 | 0.75 | 0.15 |
| 2 | 3/1 | 95 | 0.75 | 0.15 |
| 3 | 2/1 | 80 | 0.75 | 0.15 |
| 4 | 1/1 | 52 | 0.75 | 0.15 |
| 5 | 2/1 | 87 | 0.75 | 0.25 |

*Approximately 3% acrylic acid content produced by melt blending a 6 percent acrylic acid containing polymer with homopolypropylene
**As added

TABLE II

The total concentration of thioester and phenolic stabilizers affects the oxidative stability of blends of acrylic acid grafted polypropylene and homopolypropylene.*

| Sample No. | Total Concentration of Thioester and Phenolic**, wt.% | Days to Mechanical Failure at 150° C | Ratio of DSTDP to Goodrite 3114** | Total Weston 618 content, wt. % |
|---|---|---|---|---|
| 6 | 1.0 | 134 | 2/1 | 0.15 |
| 7 | 0.75 | 80 | 2/1 | 0.15 |
| 8 | 0.5 | 74 | 2/1 | 0.15 |
| 9 | 1.0 | 118 | 4/1 | 0.15 |
| 10 | 0.75 | 104 | 4/1 | 0.15 |

*Approximately 3% acrylic acid content produced by melt blending a 6 percent acrylic acid containing polymer with homopolypropylene
**As added

TABLE III

Stabilizer system works equally well with high ash and low ash polymers.

| Sample No. | Polymer Type*,** | Trace Element Analysis*, ppm | | | Days to Mechanical Failure at 150° C | Ratio of DSTDP to Goodrite 3114*** | Total Concentration of Thioester and Phenolic, wt.%*** |
|---|---|---|---|---|---|---|---|
| | | Ti | Al | Cl | | | |
| 11 | P | 5 | 26 | 13 | 80 | 2/1 | 0.75 |
| | P/A | 9 | 20 | 26 | | | |
| 12 | P | 14 | 127 | 68 | 77 | 2/1 | 0.75 |
| | P/A | 9 | 20 | 26 | | | |
| 13 | P | 5 | 26 | 13 | 101 | 2/1 | 0.75 |
| | P/A | 31 | 33 | 88 | | | |
| 14 | P | 14 | 127 | 68 | 69 | 2/1 | 0.75 |
| | P/A | 31 | 33 | 88 | | | |

*Of polymers used to prepare stabilized blend
**P refers to the polypropylene in the blend; P/A refers to the 6 percent grafted polypropylene in the blend. A total of about 3 percent acrylic acid is present in the final product.
***As added

TABLE IV

Oxidative stability of glass fiber reinforced polymers depends on the stabilizer content and dispersion of glass fiber.

| Sample No. | Glass Fiber Content, wt. % | Total Concentration of Thioester and Phenolic*, wt.% | Days to Mechanical Failure at 150° C | Ratio of Thioester to Phenolic* | Notes |
|---|---|---|---|---|---|
| 15 a) | 30 | 0.75 | 89 | 3/1 | Directly mold blend of glass fiber** and pellets |
| b) | 0 | 0.75 | 143 | 3/1 | |
| 16 a) | 30 | 0.5 | 56 | 3/1 | Directly mold blend of glass fiber** and pellets |
| b) | 0 | 0.5 | 88 | 3/1 | |
| 17 a) | 30 | 1.3 | 195 | 3/1 | Precompound glass fiber** and pellets before molding |
| b) | 0 | 1.3 | 88 | 3/1 | Directly mold blend of glass fiber concentrate** and pellets |

*As added
**Johns Manville CS308A
***Fiberfil Procon G63/70

What is claimed is:

1. A glass reinforced polyolefin composition comprising a major proportion of polyolefin and having outstanding resistance to oxidative degradation containing a synergistic stabilizer combination of
   a. 0.15 to 0.25 wt. % of cyclic neopentanetetrayl bis(octadecylphosphite) and
   b. 0.5 to 1.3 wt. % of a combination of distearyl thiodipropionate and
   c. tris(3,5-di-t-butyl-4-hydroxybenzyl isocyanurate in a ratio of 3 or 4 :1.

* * * * *